US009832987B2

(12) United States Patent
(10) Patent No.: US 9,832,987 B2
(45) Date of Patent: Dec. 5, 2017

Peterson et al.

(54) ROTATABLE SHROUD FOR DIRECTIONAL CONTROL OF APPLICATION AREA

(71) Applicant: AGCO Corporation, Hesston, KS (US)

(72) Inventors: John Peterson, Jackson, MN (US); Jeffrey Zimmerman, Jackson, MN (US); Justin Bak, Windom, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/454,597

(22) Filed: Mar. 9, 2017

(65) Prior Publication Data

US 2017/0181421 A1 Jun. 29, 2017

Related U.S. Application Data

(62) Division of application No. 14/431,562, filed on Mar. 26, 2015, now Pat. No. 9,610,595.

(60) Provisional application No. 61/707,482, filed on Sep. 28, 2012.

(51) Int. Cl.
| | |
|---|---|
| *B05B 17/00* | (2006.01) |
| *A01M 7/00* | (2006.01) |
| *B05B 3/10* | (2006.01) |
| *B05B 3/08* | (2006.01) |
| *B05B 13/00* | (2006.01) |
| *B05B 15/06* | (2006.01) |
| *B05B 15/04* | (2006.01) |

(52) U.S. Cl.
CPC ............ *A01M 7/006* (2013.01); *A01M 7/005* (2013.01); *B05B 3/085* (2013.01); *B05B 3/1014* (2013.01); *B05B 3/1021* (2013.01); *B05B 3/1064* (2013.01); *B05B 13/005* (2013.01); *B05B 15/0437* (2013.01); *B05B 15/066* (2013.01)

(58) Field of Classification Search
CPC ..... B05B 3/1021; B05B 3/085; B05B 3/1014; B05B 3/1064; B05B 13/005; B05B 15/0437; B05B 15/066; A01M 7/005; A01M 7/006
USPC ...... 239/214.23, 222, 222.11, 223, 224, 159, 239/160, 162, 164, 176, 288–288.5, 504, 239/499, 523, 524, 587.1, 587.2, 587.5, 239/587.6, 77, 1
See application file for complete search history.

(56) References Cited

U.S. PATENT DOCUMENTS 3,452,931 A * 7/1969 Knowles ............. A01M 7/0089 239/222
4,006,858 A * 2/1977 Farmery ............. A01M 7/0028 239/222
4,795,095 A * 1/1989 Shepard .................. B05B 3/105 239/224
2006/0214022 A1* 9/2006 Caccaviello ........ A01M 7/0014 239/164

* cited by examiner

*Primary Examiner* — Steven J Ganey

(57) ABSTRACT

A controlled droplet application (CDA) nozzle has a CDA nozzle cone having a first axis of rotation in a first position and, after adjustment, a second axis of rotation in a second position orthogonal to the first. A rotationally adjustable directional shroud surrounds at least a portion of the cone, the directional shroud blocking at least a portion of a lip of the cone regardless of whether the cone is positioned in the first or second axis of rotation.

12 Claims, 16 Drawing Sheets

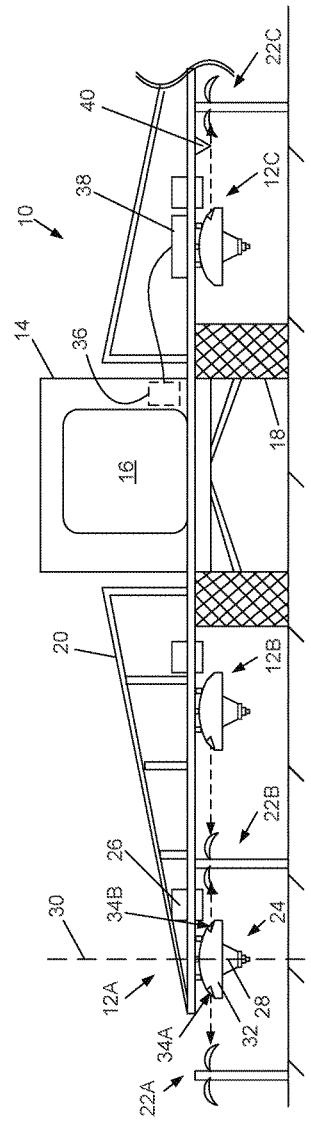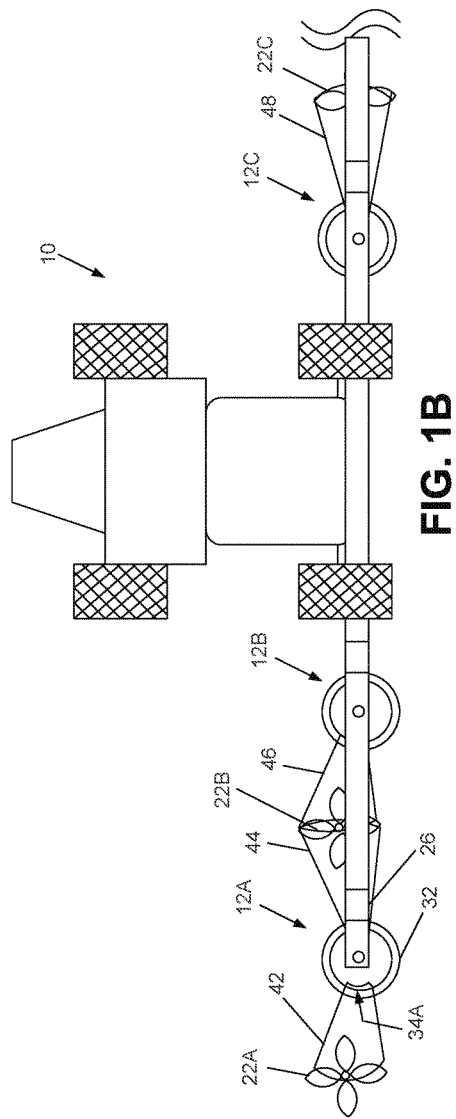

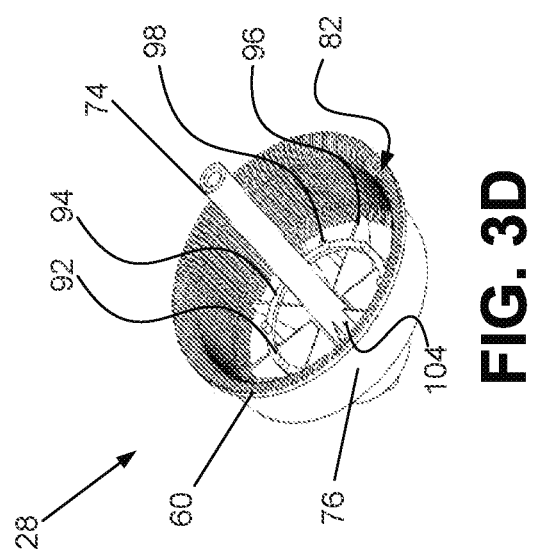

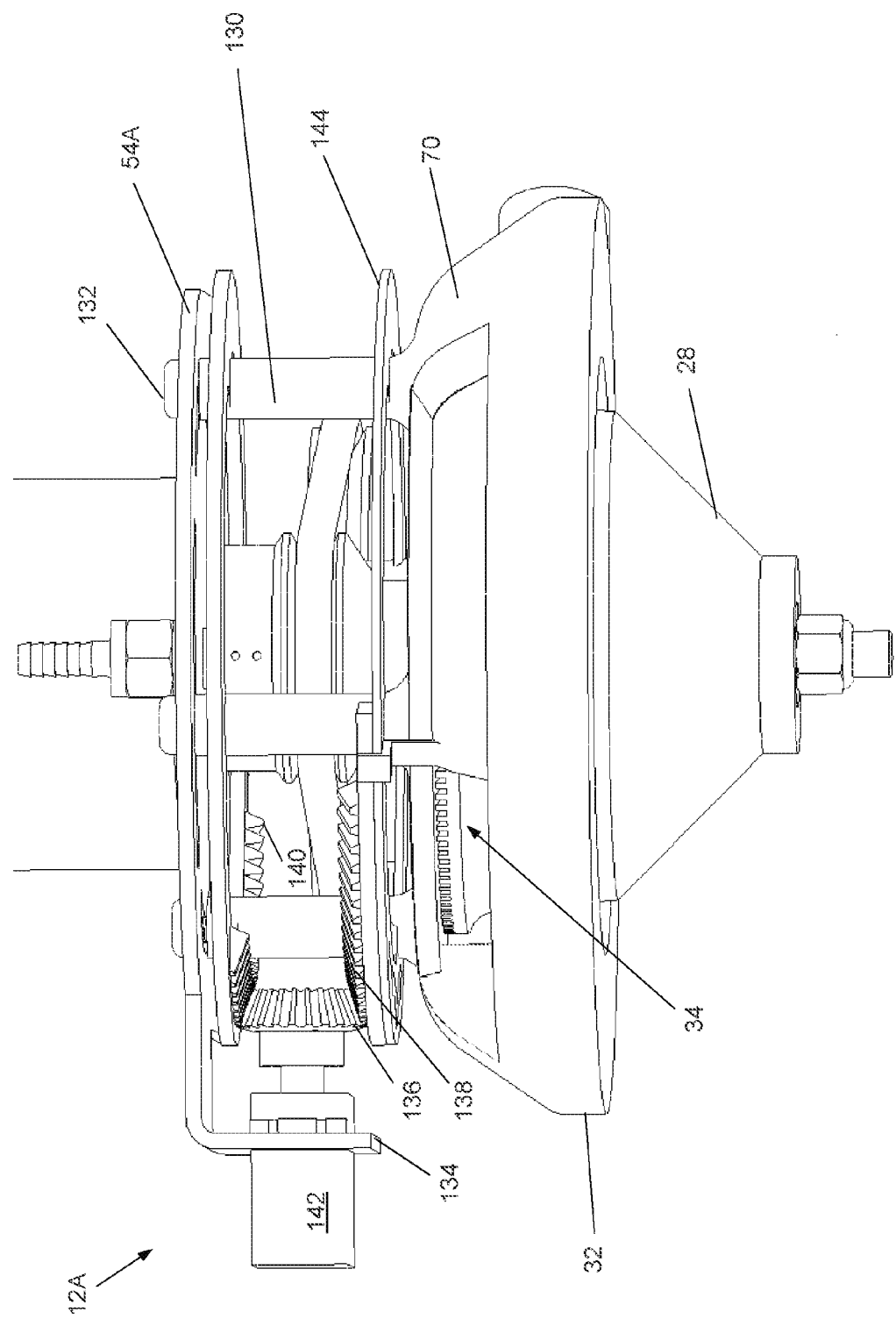

160

START

162 — CAUSE A CDA NOZZLE CONE TO FIRST ROTATE ALONG A FIRST AXIS OF ROTATION, THE FIRST ROTATION CAUSING A CIRCULAR FLUID SPRAY TO BE DISPERSED FROM THE CONE WITH SUBSTANTIALLY UNIFORM SIZE DROPLETS

164 — ADJUST THE ORIENTATION OF THE NOZZLE

166 — SUBSEQUENT TO THE ADJUSTMENT, CAUSE THE CDA NOZZLE CONE TO SECOND ROTATE ALONG A SECOND AXIS OF ROTATION ORTHOGONAL TO THE FIRST AXIS OF ROTATION, THE SECOND ROTATION CAUSING THE CIRCULAR FLUID SPRAY TO BE DISPERSED FROM THE CONE WITH SUBSTANTIALLY UNIFORM SIZE DROPLETS

END

FIG. 9

ROTATABLE SHROUD FOR DIRECTIONAL CONTROL OF APPLICATION AREA

CROSS REFERENCE TO RELATED APPLICATION

This application is a divisional application of U.S. application Ser. No. 14/431,562, filed Mar. 26, 2015, now U.S. Pat. No. 9,610,595, which claims the benefit of U.S. Provisional Application No. 61/707,482, filed Sep. 28, 2012, which is hereby incorporated by reference in its entirety.

TECHNICAL FIELD

The present disclosure is generally related to spraying technology, and, more particularly, to controlled droplet applications.

BACKGROUND

A controlled droplet application (CDA) nozzle operates on a completely different principle than conventional hydraulic nozzles. CDA nozzles deposit liquid fluid to be applied on the inside of a spinning cone. The inside of the cone may be lined with ridges traveling from the narrow end of the cone to the wide end. These ridges help impart rotational energy to the liquid fluid, spinning it faster. The ends of the ridges are used to shear the flowing liquid fluid into droplets. As the CDA cone spins faster, the smaller droplets get sheared and released from the end of the ridges, which enables the spectrum of droplet sizes to be controlled by adjusting the speed of the CDA cone.

SUMMARY OF THE INVENTION

One aspect of this invention is directed to a controlled droplet application (CDA) system having a frame and a CDA nozzle adjustably coupled to the frame. The CDA nozzle has a cone that is movable relative the frame between a first position having a first axis of rotation and a second position having a second axis of rotation wherein the second axis of rotation is orthogonal to the first axis or rotation. The CDA nozzle further has a directional shroud, the directional shroud having plural arcs. The plural arcs cover all but a portion of a product-dispensing lip of the cone.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1A is a schematic diagram that illustrates, in rear elevation view, an example environment in which certain embodiments of controlled droplet application (CDA) systems may be employed according to a first axis of rotation for the CDA nozzle cone.

FIG. 1B is a schematic diagram that illustrates, in overhead plan view, the example CDA systems of FIG. 1A and their respective truncated fluid sprays.

FIG. 3D is a schematic diagram of an embodiment of an example CDA nozzle cone in a perspective view showing a portion of an interior of the CDA nozzle cone.

FIGS. 7A-7D are schematic diagrams that illustrate an example embodiment of a CDA nozzle system for changing the angle of a spray pattern.

Figure 2A:
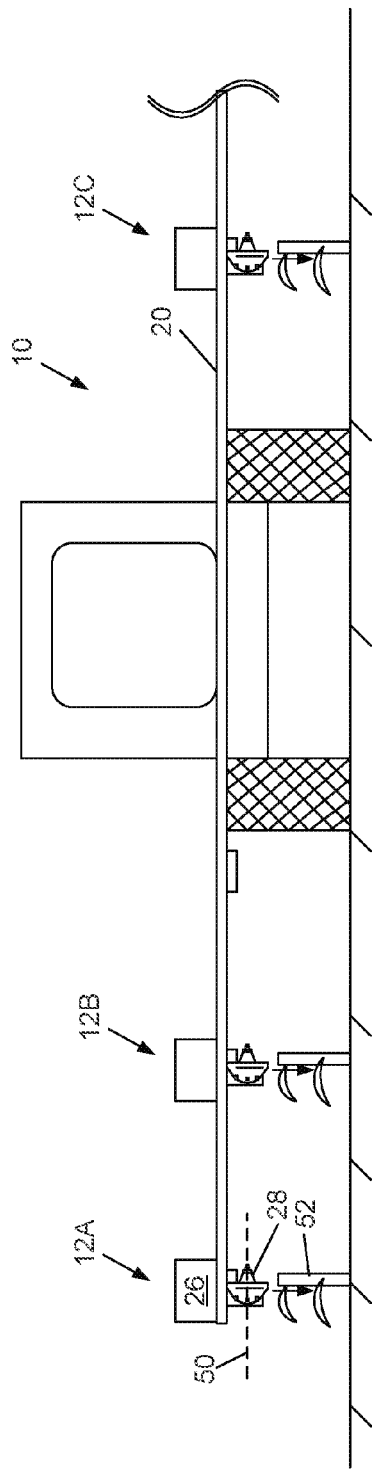
FIG. 2A is a schematic diagram that illustrates, in rear elevation view, an example environment in which certain embodiments of CDA systems may be employed according to a second axis of rotation for the CDA nozzle cone.
Figure 2B:
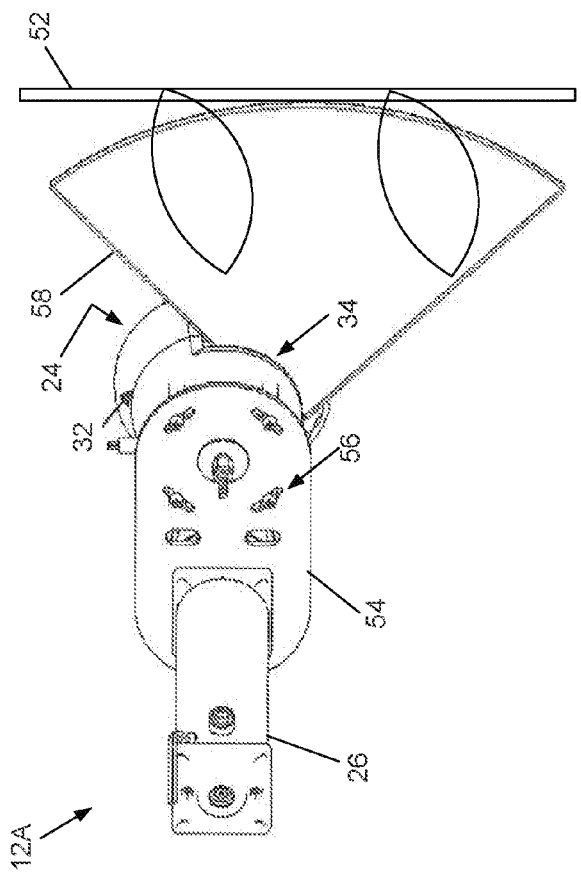
FIG. 2B is a schematic diagram that illustrates an example embodiment of one of the CDA systems shown in FIG. 2A with the CDA nozzle cone rotating along a horizontal axis and its respective fluid spray.

FIG. 8 is a schematic diagram that illustrates in another example embodiment of a CDA nozzle system.

FIG. 9 is a flow diagram of an embodiment of an example CDA method.

DESCRIPTION OF EXAMPLE EMBODIMENTS

Certain embodiments of a controlled droplet application (CDA) system and method are disclosed that enable a CDA nozzle to control the direction of uniformly sized droplets characteristically produced by CDA-type nozzles. In one embodiment, the CDA system comprises a CDA nozzle cone that is placed within a directional shroud that adjustably limits the direction in which the droplets can travel. The CDA nozzle cone may be configured in the horizontal orientation (e.g., with the center axis of the cone coincident with the horizontal axis), vertical orientation, or any other orientation, for precise control of the direction of the applied fluid spray to the intended target. For instance, the directional shroud may be configured to limit the droplet dispersion area to only the bottom 90 degrees of the CDA nozzle cone. Such a configuration results in the directional shroud collecting the droplets from the 270 degrees to the right, above, and to the left of a horizontally oriented CDA nozzle. In other words, the CDA system enables directional control over the spray.

Conventional CDA system designs also produce droplets of uniform size with a lower liquid fluid input than hydraulic nozzles. By producing droplets of uniform size, the volume of liquid fluid wasted in ineffective droplet size may be minimized. However, current CDA systems lack the ability to direct the spray pattern to anywhere but the vertical or near vertical orientation. For instance, conventional CDA nozzle cones are spun in a vertical or near vertical orientation (e.g., within ten (10) degrees of the vertical axis) to provide a circular pattern, possibly wasting liquid fluid (hereinafter, the latter also referred to merely as fluid) where the application of the spray is not needed. In contrast, CDA systems of the present disclosure may operate with the cone oriented in the horizontal, vertical (e.g., in orthogonally different orientations), or any other direction/orientation. In addition, certain embodiments of CDA systems comprise a rotationally adjustable, directional shroud, providing more precise control of the direction of the applied fluid spray, which may result in less waste since areas unintended for fluid treatment are blocked from spray application by the directional shroud.

Having summarized certain features of CDA systems of the present disclosure, reference will now be made in detail to the description of the disclosure as illustrated in the drawings. While the disclosure will be described in connection with these drawings, there is no intent to limit it to the embodiment or embodiments disclosed herein. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Referring now to FIG. 1A, shown is a simplified schematic of a rear end of an agricultural machine embodied as a self-propelled sprayer machine 10, which provides an example environment in which one or a plurality of controlled droplet application (CDA) systems 12 (e.g., 12A, 12B, and 12C) may be employed. It should be appreciated within the context of the present disclosure that the example CDA systems 12 may be used on other agricultural machines or machines for other industries with similar or different configurations than those depicted in FIG. 1A, including as part of a towed implement or affixed to other machines. Certain features of sprayer machines well known to those having ordinary skill in the art are omitted in FIGS. 1A-2B to avoid obfuscating pertinent features of CDA systems 12. The sprayer machine 10 comprises a cab 14 and a tank 16 that mounts on a chassis. The cab 14 comprises operational controls that an operator interfaces with to navigate and/or control functions on the sprayer machine 10. Note that some embodiments may utilize automated machines that need not have an operator residing in the cab 14, or in some embodiments, the sprayer machine 10 may be operated via remote control. The tank 16 stores liquid fluid for use in dispensing to targets located in a field traversed by the sprayer machine 10. The sprayer machine 10 further comprises wheels 18 to facilitate traversal of a given field, though some embodiments may utilize tracks. It should be appreciated that the axle arrangement depicted in FIGS. 1A-1B is merely illustrative, and that other arrangements are contemplated to be within the scope of the disclosure. The sprayer machine 10 further comprises a boom 20 branching out from both sides of the sprayer machine 10 and shown in truncated form on the right hand side of FIG. 1A. The boom 20 comprises conduit(s) (e.g., metal or rubber/plastic tubing, wiring, cable, etc.) for hydraulics, pneumatics, electronics, etc., as well as comprising different motive force devices such as pumps, motors, power sources, etc. to influence the flow of fluids and/or to control the operations and/or positioning of certain devices, such as the CDA systems 12.

The sprayer machine 10 navigates across the field to dispense fluid from the CDA systems 12 to various targets. The CDA systems 12 may spray fluids (e.g., chemicals) on crops, bare ground, pests, etc., as pre-emergence and/or post-emergence herbicides, fungicides, and insecticides. In this example, the targets comprise the leafy areas of crops 22 (e.g., 22A, 22B, 22C, etc.), though other portions of the crops 22 may be targeted depending on the application. Each CDA system 12, such as CDA system 12A (used an illustrative example hereinafter, with the understanding that each CDA system may have similar features), comprises a CDA nozzle 24 and an actuator 26 (e.g., rotational actuator), the actuator 26 causing rotation of a cone 28 of the CDA nozzle 24 based on the use of a pulley (not shown). In some embodiments, other mechanisms for causing cone rotation may be used, as is described below. The CDA system 12 may be mounted to the boom 20 directly or via a frame that enables the CDA system 12 to be adjusted to vary the axis of rotation of the cone. In the example depicted in FIG. 1A, the cone 28 is directed downward, and the axis of rotation 30 is in the vertical direction. As should be appreciated within the context of the present disclosure, the CDA system 12 may be operated in other axes of rotation, and this example is merely illustrative of one implementation.

The nozzle 24 further comprises a directional shroud 32 with one or more apertures 34 through which fluid spray passes the directional shroud 32 and impacts the target (e.g., the leafy portion of the crop 22A). In FIG. 1A, the dispersed fluid spray is denoted with a dashed arrowhead extending from the aperture 34. The directional shroud 32 comprises a deflector portion that covers (e.g., sufficient to block fluid discharge) all but a portion (e.g., single portion or multiple contiguous or discontiguous portions) of the fluid discharge end of the cone 28. The fluid discharge end of the cone 28 provides a circular fluid spray pattern that is modified by the deflector portion of the directional shroud 32. The apertures 34 are locations where the deflector portions do not cover (e.g., block fluid discharge from) the fluid discharge ends of the cone 28, enabling a modified or truncated fluid spray to reach the targeted area with precise directional control. The directional shroud 32 further comprises a reclamation portion that lies beneath the deflector portion in FIG. 1A, and which collects the blocked fluid in a channel and routes the collected fluid back to a reservoir for re-use in the CDA systems 12 or for other uses. The deflector and reclamation portions may be detachably coupled (e.g., modular) sections of the directional shroud 32 in some embodiments, or combined in an integrated (e.g., molded or cast) assembly in some embodiments. The directional shroud 32 enables the nozzle 24 to mount to the boom 20.

The CDA system 12A is depicted in FIG. 1A with two apertures 34A and 34B, through which the fluid spray is dispersed to hit the targets 22A and 22B, respectively. The blocked fluid spray is collected in the reclamation portion of the directional shroud 32 and routed to a reservoir (e.g., local to the nozzle 24, or in some embodiments, remote, such as a reservoir configured as the tank 16). The CDA systems 12B and 12C are each shown with a single aperture to enable the fluid spray to hit the targets 22B and 22C, respectively. Some implementations may utilize other CDA system configurations depending on the crop profile and/or conditions (e.g., weather and/or field) for a given field. The configurations depicted in FIG. 1A are merely for illustrating certain capabilities of CDA systems 12, and not intended to be limiting.

The manner of configuration of the CDA systems 12 may be manually adjusted based on a crop profile of the field to be traversed. For instance, a map of the crop profile for a given field may be printed out (e.g., remotely or locally to the sprayer machine 10) and used by an operator of the sprayer machine 10 to manually configure each CDA system 12. For instance, the operator may manually adjust the angle at which the CDA system 12 is mounted to the boom 20 (or frame) and/or manually adjust (or replace) the directional shroud 32 of the nozzle 24 to ensure that the fluid spray dispersed from each CDA system 12 precisely and efficiently hits the target. In some embodiments, additional information may be used to assist the operator in adjusting the CDA systems 12, such as weather conditions, the extent of pest infestation, soil information, among other information.

In some embodiments, the adjustment of all or a portion of the CDA systems 12 may be achieved in an automated or semi-automated manner using all or a portion of the information described above. For instance, the crop profile and/or the other aforementioned information may be loaded onto a disk or memory stick and inserted in a computer 36 (shown in phantom in FIG. 1A) located on the sprayer machine 10. In some embodiments, the same information may be communicated to a communications interface of the computer 36 or other electronics device over a wireless network or radio frequency channel. The operator may review the information on a graphical user interface (GUI) associated with the computer 36 or other device (e.g., located in the cab 14) and depress one or more switches on the cab operator console to activate various actuators, such as the example actuator 38 shown associated with the CDA system 12C. The activation of the actuator 38 may cause auto-adjustment of the CDA system 12 to change the axis of rotation for the associated cone, and/or to cause rotational adjustment of the directional shroud 32. For instance, in one embodiment, as explained further below, the directional shroud 32 may be rotated relative to the fluid discharge end of the cone 28 to position one or more apertures in the directional shroud 32 as needed, or in some embodiments, components within the directional shroud 32 (e.g., deflectors internal to the outer surface of the shroud 32) and moveable relative to the outer surface of the directional shroud 32 may be adjusted to deflect the flow of fluid within each aperture. In some embodiments, a combination of these methods may be used. In some embodiments, the GUI may be used like the print out scenario described above, providing instructions for the operator to physically change the nozzle and/or shroud orientation. Likewise, in some embodiments, the print out may be used by the operator to make the orientation adjustments from a console in the cab (which is communicated from the computer 36 to the actuators 38).

In some embodiments, one or more sensors, such as sensor 40, may be affixed to the boom 20 and/or other locations of the sprayer machine 10. The sensors 40 may operate in the visible range, infrared range, acoustic range, etc., and may be used to determine certain information pertaining to a desired target in the field, such as the height of the leafy parts of the crop or other profile information. In some embodiments, the same or additional sensors may be used to acquire other information, such as weather conditions, soil conditions, topology information, vehicle information, etc. The feedback to the computer 36 from the sensors 40 may be used to trigger control signaling from the computer 36 to the actuators 38 to cause the changes in cone and/or directional shroud orientation. The aforementioned automated controls may be performed in some embodiments with at least some operator intervention (e.g., to confirm the suitability of the change, to prevent erroneous results, etc.). In some embodiments, the computer, sensing, and actuator functionality may be integrated in fewer components. For instance, the sensor 40 may be configured as a smart sensor with computer processing functionality that may control the actuator 38 directly. It should be appreciated within the context of the present disclosure that other variations of control of the cone 28 and/or directional shroud orientation may be employed and hence are contemplated to be within the scope of the disclosure.

Referring to FIG. 1B, shown is a simplified schematic in overhead plan view of the sprayer machine 10 and associated components from FIG. 1A. Of particular focus is the CDA systems 12 and their associated directed or truncated fluid sprays. For instance, and referring to the CDA system 12A as one illustrative example, the directional shroud 32 is configured to block all but a portion of the circular fluid spray that is dispersed from the discharge end of the cone 28 (FIG. 1A), that un-blocked portion depicted in FIG. 1B as the truncated fluid sprays (e.g., spray arcs) 42 and 44 that pass through respective apertures 34A and 34B (the aperture 34B obscured from view in FIG. 1B, but shown in FIG. 1A). The fluid sprays 42 and 44 are precisely directed to relevant portions of the crops 22A and 22B, based on configuration of the axis of rotation of the cone 28 and the orientation of the directional shroud 32 (or components therein). Similarly, CDA systems 12B and 12C provide truncated fluid sprays 46 and 48, respectively, to impact, with precise directional control, the respective targeted crops 22B and 22C.

FIG. 2A provides another illustration demonstrating the precise control of the fluid spray dispersed on crops. It should be appreciated within the context of the present disclosure that the example illustration of FIG. 2A is merely one example of many other possible implementations. Certain portions of the boom 20 (e.g., as depicted in FIG. 1A) are omitted in FIG. 2A to avoid adding further complexity to the figure and to facilitate an understanding of certain features. In this example, the sprayer 10 comprises the CDA nozzles 12 (e.g., 12A, 12B, 12C, etc.) oriented with a cone axis of rotation 50 that is orthogonal (though not limited to an orthogonal arrangement) to the axis of rotation 30 of FIGS. 1A-1B. That is, the axis of rotation 50 is in the horizontal orientation. Such a configuration may be used, for instance, when the crops 52 are more mature (e.g., greater in height) and the targeted areas of the crop 52 span a greater length or coverage area. The fluid spray is dispersed from the rotating cone 28 in similar manner as described in association with the vertical axis of rotation 30. Referring now to FIGS. 2A and 2B, the CDA system 12A comprises the actuator 26 coupled to a frame 54, the latter adjustably coupled to the boom 20. The frame 54 is also adjustably coupled to the nozzle 24 comprising the directional shroud 32. For instance, as shown in FIG. 2B, plural slots 56 are disposed in the frame 54, through which bolts or other securing components may be loosened to enable the rotation of the directional shroud 32. A fluid spray 58 dispersed from the aperture 34 of the directional shroud 32 is in the form of a truncated spray (e.g., vertical arc) that targets the entire length of the crop 52, enabling precise and directed control of the fluid spray. In other words, the circular fluid spray dispersed from the cone 28 of the nozzle 24 is modified by a deflector portion of the directional shroud 32, with the undeflected fluid spray 58 dispersed through the aperture 34 to precisely and controllably reach the target.

Figure 3A:
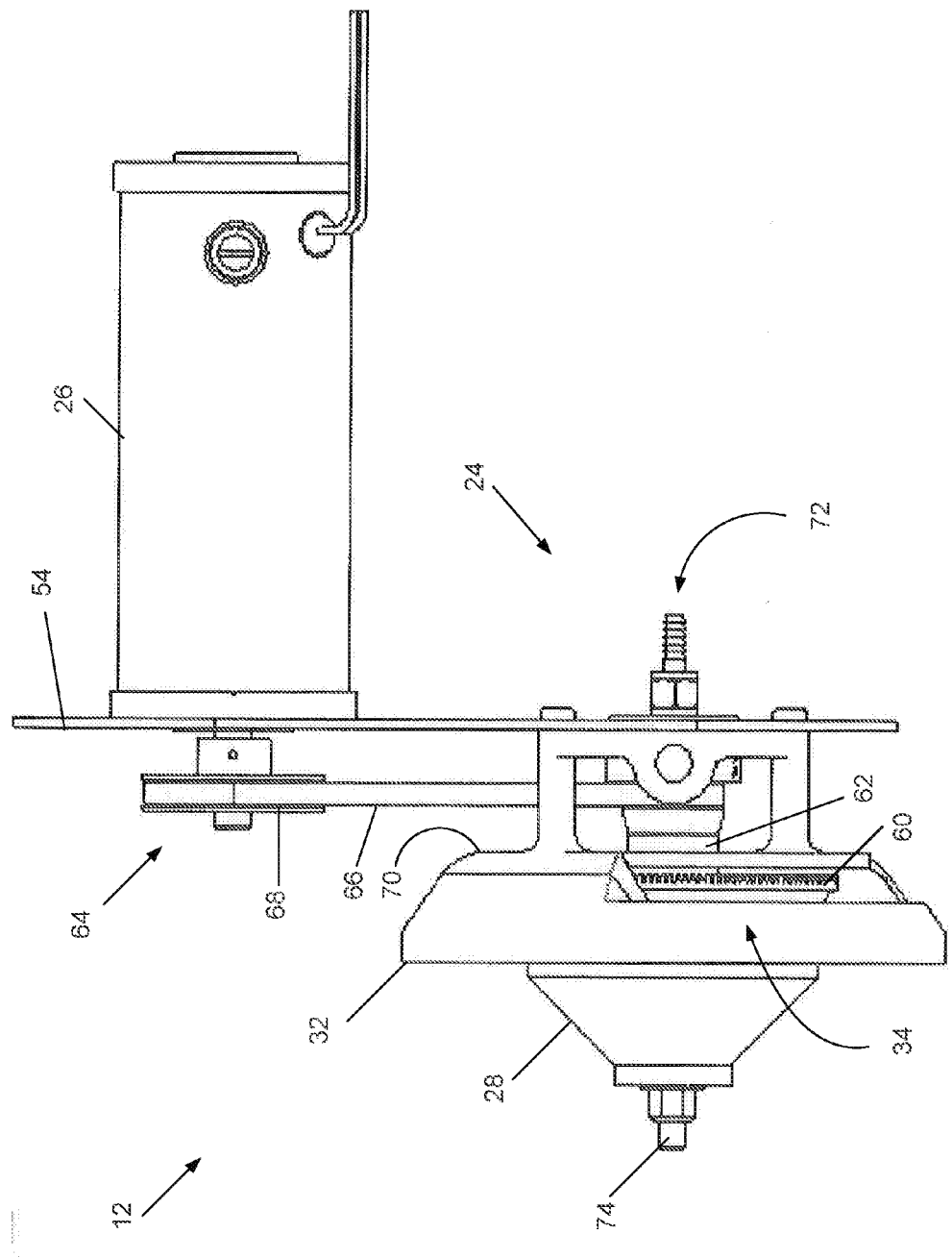
FIG. 3A is a schematic diagram that generally depicts an embodiment of an example CDA system with a CDA nozzle in horizontal orientation and covered in part by a directional shroud.
Figure 3B:
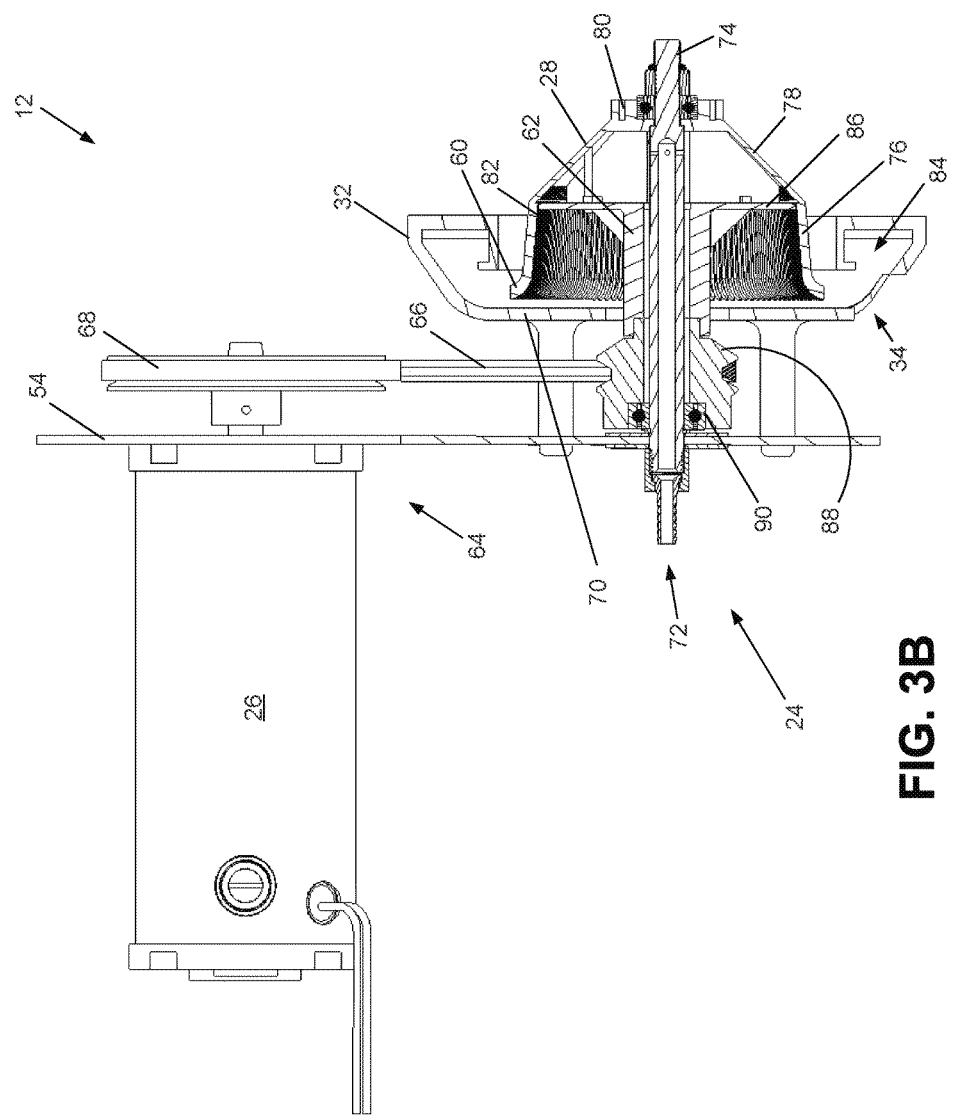
FIG. 3B is a schematic diagram showing select features in cut-away view of the example CDA system shown in FIG. 3A.

The change in the axis of rotation from FIGS. 1A-1B to FIG. 2A may be performed manually (e.g., by an operator physically moving the CDA systems 12 on the boom 20 or manipulating controls on an operator console to cause an actuator (e.g., similar to actuator 38 in FIG. 1A, with a rail or the like upon which the frame 54 may be rotated or angularly adjusted)) to change the orientation, automatically (e.g., using computer and sensing functionality), or according to a combination of operator intervention and automated or semi-automated control. In other words, control may be achieved in similar manner to that described above in association with FIGS. 1A-1B.

Although orthogonal positioning/adjustment of the axes or rotation (e.g., vertical to horizontal) has been described in association with FIGS. 1A-2B, it should be appreciated that the orientation of the axis of the cone 28 may be adjusted according to a variety of different angles using different mechanisms (e.g., infinitely variable, or variable in stepped increments).

Having described an example environment in which certain embodiments of CDA system adjustment have been described, attention is directed to FIGS. 3A-3D, which depict several illustrations of an embodiment of a CDA system 12, with each illustration focusing on select features of the system. One having ordinary skill in the art should appreciate in the context of the present disclosure that the CDA system 12 shown in, and described in association with, FIGS. 3A-3D, is merely illustrative, and that other system arrangements with fewer or additional components are contemplated to be within the scope of the disclosure. As is evident by comparison among FIGS. 3A-3D, certain features are omitted in each figure to emphasize the features shown in a particular figure. Referring now to FIG. 3A, shown is an embodiment of an example CDA system 12. As described above, the CDA system 12 may be secured to a tractor frame, boom, among other agricultural equipment similar to implementations for conventional CDA nozzles. The CDA system 12 exhibits some of the well-known characteristics of conventional CDA nozzles, including the provision of a substantially uniform size fluid droplet based on low flow inputs.

The CDA system 12 comprises the CDA nozzle 24 that is depicted in FIG. 3A in the horizontal orientation, though any orientation may be used. The CDA nozzle 24 comprises the cone 28 and the directional shroud 32 that covers at least a portion of the fluid-discharge end of the cone 28. For instance, in one embodiment, the cone 28 comprises a circumferential, outward-directed lip 60 from which the substantially uniform size fluid droplets are dispensed in a circular flow pattern. The directional shroud 32 blocks all but a portion of the dispensed fluid, such as a portion that passes the directional shroud 32 through the aperture 34 of the directional shroud. In one embodiment, the aperture 34 is defined by a single arc (or a plurality of arcs in some embodiments) serving as a deflector and located on or adjacent the surface of the directional shroud 32. The CDA nozzle 24 also comprises a shaft 62 that runs longitudinally through a portion of the cone 28. Disposed concentrically within the shaft is a hollow spindle that introduces fluid into the cone 28, as described further below. The shaft 62 is coupled to the cone 28 and is engaged by a drive system 64 to cause rotation of the cone 28. The cone 28 rotates to produce droplets from an inputted fluid stream. In one embodiment, the drive system 64 comprises the rotational actuator 26 and a pulley 66. The pulley 66 engages a wheel 68 of the rotational actuator 26 and also engages the shaft 62 of the nozzle 24 to cause rotation of the cone 28. The drive system 64 and nozzle 24 are mounted to the frame 54, the nozzle 24 mounted to the frame 54 by a frame coupling portion 70 of the directional shroud 32. The frame coupling portion 70 secures the directional shroud 32 to the frame 54. An input end 72 extending beyond the frame 54 and a nut at the opposite end compress the frame 54, the pulley 66, shaft 62, and the cone 28 together. The directional shroud 32 is mounted independently onto the frame 54, as noted above, and around the rotating sub-assembly (e.g., pulley 66, shaft 62, and cone 28), and hence the rotating sub-assembly rotates approximately in the middle of the directional shroud 32. In some embodiments, the frame coupling portion 70 and the directional shroud 32 may be a single piece construction (e.g., molded part), or in some embodiments, modular, coupled components that are moveable (e.g., rotationally) or fixed (e.g., secured, attached, etc.) relative to each other. The frame 54 may be connected (e.g., in adjustable or in some embodiments, fixed manner) to the boom 20 (FIG. 1A) of the sprayer machine 10, or other machines (e.g., a towed implement). In one embodiment, the frame 54 rigidly secures the aforementioned components with respect to each other.

Fluid is provided to the input 72 of the nozzle 24. The fluid may be provided through a flow control apparatus or system, as is known in the art. For instance, a flow control system may meter a defined volume of fluid into the input 72, the fluid then flowing through a hollow, stationary spindle 74 for deposit into the interior of the cone 28.

In one example operation, the rotational actuator 26 of the drive system 64 provides rotational motion to rotate the cone 28. In other words, the pulley 66 transfers the rotational motion of the rotational actuator 26 to the shaft 62, which through coupling between the shaft 62 and the cone 28, causes the cone 28 to rotate. The shaft 62 rotates around a stationary spindle 74 that is surrounded by the shaft 62, as explained below. In one embodiment, an even flow of fluid is injected by a flow control system into the input 72. The fluid flows through the hollow spindle 74 and is discharged via one or more openings in the spindle 74 into the interior space of the cone 28. In one embodiment, fins of a fin assembly located internal to the cone 28 divide and compartmentalize the fluid evenly inside the cone 28 and ensure that the cone 28 produces an even distribution of uniformly-sized droplets. In some embodiments, the fin assembly may be omitted.

It should be appreciated within the context of the present disclosure that variations of the aforementioned CDA system 12 are contemplated and considered to be within the scope of the disclosure. For instance, in some embodiments, the drive system 64 may include a belt, gears, chain, hydraulic motor, pneumatic motor, etc. In some embodiments, the depicted drive system 64 may be omitted in favor of drive system that includes a direct coupling between a motor and the cone 28. In some embodiments, additional structure and/or components may be included, such as a precise speed control of the cone 28, a fan to assist droplet travel and penetration (e.g., into foliage), among other structures. Although not limited to a specific performance, some example performance metrics of the CDA system 12 may include a minimum flow rate of approximately 0.05 gallons per minute (GPM), a maximum flow rate of approximately 0.3 GPM, a minimum cone speed of approximately 2500 RPM, and a maximum cone speed of approximately 5000 PRM. These metrics are merely illustrative, and some embodiments may have greater or lower values.

Attention is now directed to FIG. 3B, which provides a cutaway view of certain features of the CDA system 12 shown in FIG. 3A. Note that in some embodiments, the CDA system 12 may comprise the nozzle 24 and the drive system 64 coupled to the frame 54. In some embodiments, the CDA system 12 may comprise fewer or greater numbers of components. Recapping from the description above, the CDA system 12 comprises the CDA nozzle 24. The CDA nozzle 24 comprises the cone 28, the directional shroud 32, the shaft 62, and a spindle 74. In one embodiment, the cone 28 comprises a geometrical configuration that includes the circumferential lip 60 from which droplets are dispersed to a target according to a circular spray pattern. In one embodiment, the lip 60 is directed outward from the central axis of the cone 28. In some embodiments, the lip 60 is not directed outward relative to the central axis of the cone 28. The cone 28 also comprises a wide portion 76 and a narrow portion 78 that includes a base 80. The narrow portion 78 includes a diameter that decreases from the wide portion 76 to the base 80. In some embodiments, within the cone 28 corresponding to an interior surface of the narrow portion 78 is a fin assembly, as described further below. The interior surface of the cone 28 corresponding to the lip 60 and the wide portion 76 (and partially the narrow portion 78) comprises a plurality of longitudinal ridges 82, each pair of ridges 82 defining grooves therebetween to channel the fluid as the cone 28 rotates to provide a circular flow pattern of droplets released at the lip 60. In other words, the uniform droplets are dispersed from grooves (the grooves formed by plural ridges 82 in the interior surface of the cone 28, the ridges breaking off the droplets as the fluid flows from the grooves) at the lip 60 in circular fashion. All but a portion of the dispersed fluid is blocked by the directional shroud 32. The unblocked fluid dispersed from the lip 60 passes the directional shroud 32 via the aperture 34 and hence is directed to a target, such as the ground or foliage (e.g., crops, weeds, etc.). The blocked fluid is captured and routed by an internal channel 84 created by a reclamation portion of the directional shroud 32 and fed to a fluid reclamation system.

The nozzle 24 further comprises the shaft 62, which extends from one end of the cone 28 and is coupled to the interior surface of the cone 28. The shaft 62 surrounds (e.g., concentrically) at least a partial length of the hollow spindle 74. The hollow spindle 74 receives fluid (e.g., from a flow control system) from the input 72 and dispenses the fluid into the interior of the cone 28 corresponding to the narrow portion 78 (e.g., proximal to the base 80). The spindle 74 is coupled to the base 80 of the cone 28. Introduced in FIG. 3B is a circular cap 86 that segments the interior of the cone 28 in a plane proximal to the transition between the wide portion 76 and the narrow portion 78. In one embodiment, the cap 86 is integrated (e.g., molded, cast, etc.) with the shaft 62. In some embodiments, the cap 86 is coupled to the shaft 62 according to other known fastening mechanisms, such as via welding, riveting, screws, etc. In one embodiment, the cap 86 is also mounted to a fin assembly as described further below, although in some embodiments, the fin assembly may be omitted and the shaft 62 coupled to the cone 28 according to other fastening mechanisms. For purposes of brevity, the remainder of the disclosure contemplates the use of a fin assembly, with the understanding that the fin assembly may be omitted in some embodiments. The shaft 62 further comprises a hexagonal key portion 88 and bearing assembly 90 disposed between the frame 54 and the cone 28. The key portion 88 provides an area of engagement for the pulley 66 of the drive system 64, at the nozzle 24, the other area of engagement at the wheel 68 associated with the rotational actuator 26 of the drive system 64. The bearing assembly 90 (along with a bearing assembly on an opposing end of the spindle 74, as described below) enables the spindle 74 to guide the rotation of the shaft 62 and cone 28 relative to the stationary spindle 74, as driven by the drive system 64.

Also depicted in FIG. 3B, the directional shroud 32 mounts to the frame 54 via the frame coupling portion 70, as described above. The directional shroud 32 may be adjusted (e.g., in height) to enable the cone 28 to disperse the fluid in a fully circular spray of fluid or positioned to enable a truncated spray pattern. For instance, the directional shroud 32 may be offset from the outlet (e.g., lip 60) of the cone 28 (e.g., lifted closer to the frame 54) to avoid interfering with the discharge of the fluid droplets and hence enable a fully circular spray pattern of uniform droplets from the lip 60. In some embodiments, the directional shroud 32 may be in a fixed position relative to the distance between the shroud 32 and the cone 28. In some embodiments, the directional shroud 32 may be positioned to block all but a portion of the circular spray pattern of the dispersed fluid, enabling a truncated spray pattern (e.g., in the form of a single arc spray pattern or plural arc spray patterns). The positioning of the directional shroud 32 may be achieved through manual adjustment, or in some embodiments, automatically (e.g., as controlled by a stepper motor or driven gear assembly coupled to the frame 54).

Figure 3C:
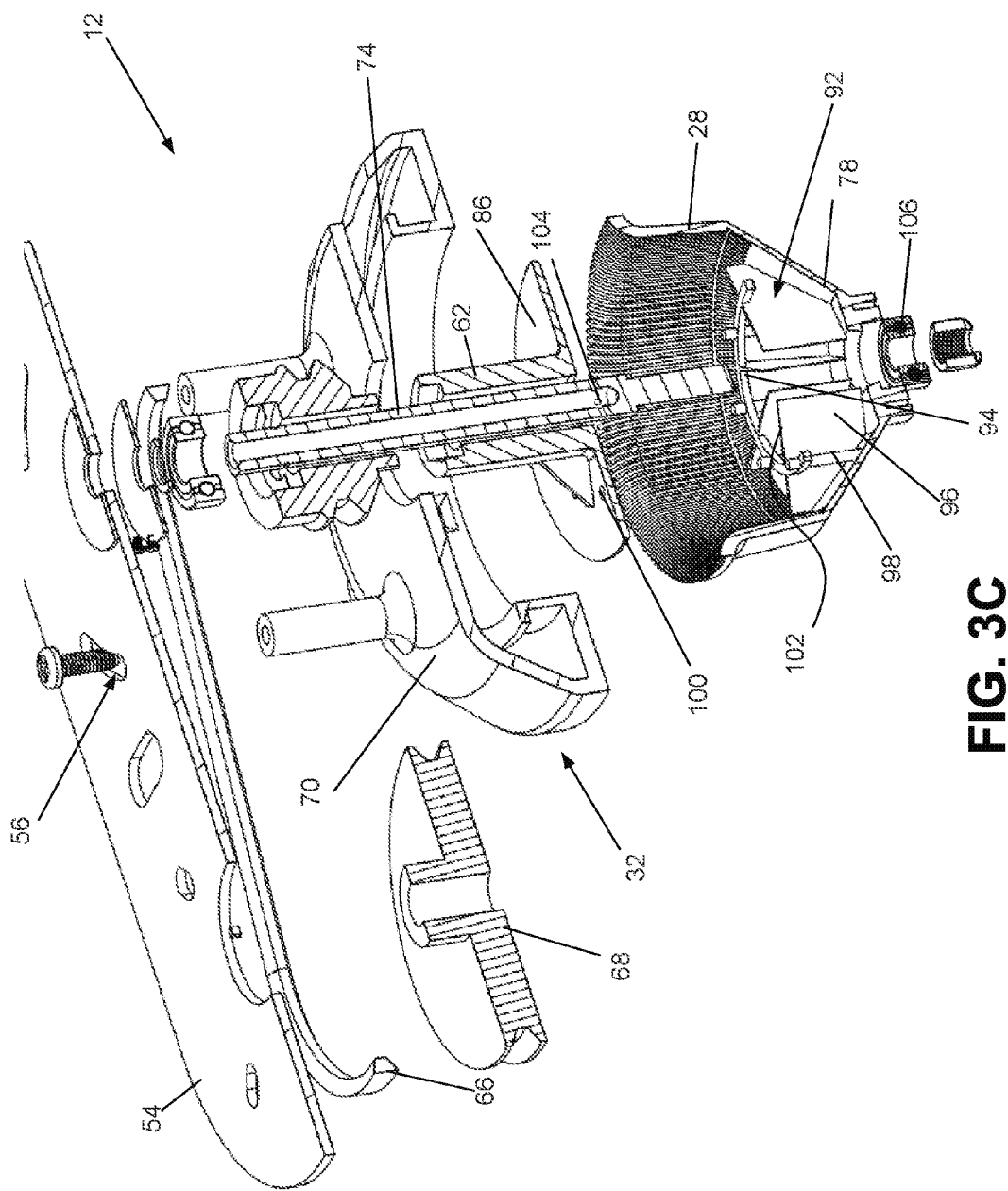
FIG. 3C is a schematic diagram showing certain features in exploded view of the example CDA system shown in FIG. 3A.

Referring to FIG. 3C, an exploded view of certain features of the CDA system 12 of FIGS. 3A-3B is shown. The frame 54 comprises the slots 56 to enable rotational adjustment of the directional shroud 32 (which may include embodiments where arcs or deflectors located within the directional shroud 32 are rotated independent of the directional shroud 32), as described above. The wheel 68, pulley 66, and shaft 62 have already been described in association with FIGS. 3A-3B, and hence further discussion of the same is omitted here for brevity except where noted below. Of particular focus for purposes of FIG. 3C is a fin assembly 92, which includes a ring 94, a plurality of fins 96 coupled to or integrated with the ring 94, and a plurality of pins 98 disposed between each pair of fins 96. The fin assembly 92 depicted in FIG. 3C is one example configuration, and it should be appreciated that other configurations of the fin assembly (e.g., with a fewer or greater number of pins 98 or fins 96) are contemplated to be within the scope of the disclosure. The fin assembly 92 is connected to the interior surface of the cone 28 corresponding to the narrow portion 78, and in particular, connected via the pins 98. Further, the cap 86 of the shaft 62 mounts to the fin assembly 92 via the pins 98 and the cap holes 100 of the cap 86. The cap 86 rests on an edge 102 of each fin 96 of the fin assembly 92. Note that the shaft 62 and the cap 86 are depicted as an integrated assembly (e.g., molded or cast piece), though in some embodiments, may be affixed to each other by known fastening mechanisms. Note that the spindle 74 comprises one or more holes 104 that permit the release of the fluid, inserted at the input 72 (FIG. 3B) and carried through the hollow spindle 74, to the interior of the cone 28. At the base 80 of the cone 28 is a bearing assembly 106, as indicated above.

Turning attention now to FIG. 3D, shown in perspective is a portion of the interior of one embodiment of the cone 28 (with some features omitted for purposes of brevity of discussion, such as the cap 86). It should be appreciated within the context of the present disclosure that variations in the depicted structure are contemplated for certain embodiments, such as fewer or additional fins, and/or the extension (or reduction) of the quantity of ridges along a greater (or lesser) area of the interior surface of the cone 28. As depicted in FIG. 3D, the cone 28 comprises the hollow spindle 74. The spindle 74 comprises the openings 104 (one shown) proximal to the fin assembly 92, the holes 104 permitting the deposit of the fluid into the interior space of the cone 28. The cone 28 further comprises the longitudinal, discontiguous ridges 82 disposed on at least a portion of the interior surface (e.g., corresponding to the lip 60, wide portion 76, and a part (e.g., less than the entirety) of the narrow portion 78 (FIGS. 3A-3C). In some embodiments, the ridges 82 may occupy a larger amount of the interior surface, or a smaller part in some embodiments, or be contiguous throughout the interior surface of cone 28. Between the ridges 82 are grooves which enable the channeling of fluid injected from the spindle 74 to dispersion as droplets in a circular spray pattern beyond the lip 60.

The interior of the cone 28 further comprises the fin assembly 92, as described above in association with FIG. 3C. In one embodiment, the fin assembly 92 is disposed in an interior space adjacent the narrow portion 78 (e.g., the narrow portion 78 having a decreasing diameter from the wide portion 76 to the base 80 (FIGS. 3A-3C)). As described above, the fin assembly 92 comprises the ring 94 that, in one embodiment, encircles a central or center region of the cone 28 occupied by the spindle 74. In one embodiment, a central axis of the ring 94 is coincident with a central axis of the spindle 74. The ring 94 is integrated with (e.g., casted or molded, or in some embodiments, affixed to) the plurality of the fins 96. The fins 96 extend from a location longitudinally adjacent the spindle 74 to the interior surface of the cone 28. In one embodiment, one or more edges of each fin 96 is flush (e.g., entirely, or a portion thereof) with the interior surface of the cone 28. In some embodiments, one or more edges of each fin 96 is connected (e.g., along the entire edge or a portion thereof in some embodiments) to the interior surface of the cone 28. In some embodiments, a small gap is disposed between one or more edges of each fin 96 (or a predetermined number less than all of the fins 96) and the interior surface closest to the fin 96. In some embodiments, the fins 96 may be affixed to the ring 94 by known fastening mechanisms (e.g., welds, adhesion, etc.) or integrations (e.g., molded, cast, etc.). The ring 94 further comprises the plural pins 98 that enable the mounting of the cap 86 (FIG. 3C) of the shaft 62 (FIG. 3A) to the fin assembly 92, which also enables the shaft 62 to cause the rotation of the cone 28. The pins 98 also secure the fin assembly 92 to the interior surface of the narrow portion 78.

Figure 4:
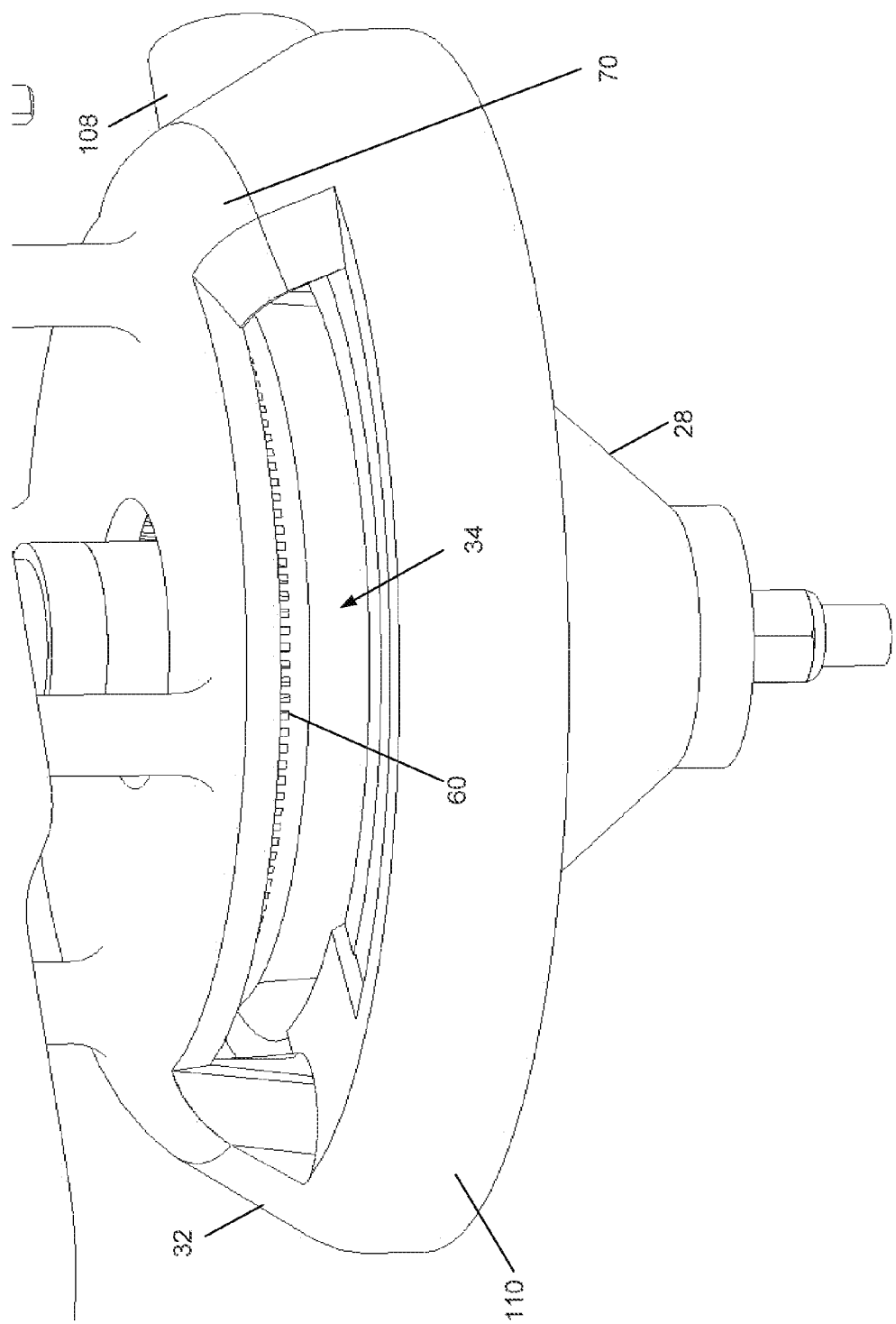
FIG. 4 is a schematic diagram of an embodiment of an example CDA nozzle having a directional shroud that covers all but a portion of a circumferential lip of a cone of the CDA nozzle.

FIG. 4 provides a close-up schematic of the directional shroud 32 of the CDA system 12. As depicted in FIG. 4, the directional shroud 32 covers all but a portion of the cone 28, and in particular, all but a portion of the lip 60 of the cone 28. The directional shroud 32 has a saucer-like shape, and comprises an aperture 34 that enables the fluid dispersed from the lip 60 to pass through the directional shroud 32. The balance of the fluid dispersed from the lip 60 is blocked by the arc portion(s) of the directional shroud 32, and channeled via the channel 84 (FIG. 3B) to a drain 108 to be recovered at a reservoir of the fluid or other reservoir (e.g., tank 16, FIG. 1A). The arc portion or portions (deflector(s)) may be integrated with, coupled to, or adjacent the directional shroud 32 and adjacent the frame coupling portion 70. In some embodiments, the arc portion(s) may be integrated with, or coupled to, or adjacent both the bottom and frame coupling portion 70 of the directional shroud 32, or entirely integrated with, coupled to, or adjacent the frame coupling portion 70. Reference to the term "shroud" or "directional shroud" contemplates each of these embodiments. As indicated above, the frame coupling portion 70 may be integrated with the directional shroud 32 as a single piece, or configured as a multi-piece assembly. The directional shroud 32 further comprises a reclamation portion 110 located in FIG. 4 in the bottom portion of the directional shroud 32 (e.g., directly beneath (and adjacent to) the arc(s) or deflector(s) of the shroud 32). Hereinafter, the terms arc and deflector are used interchangeably, in singular format (unless plural for explanation), with the understanding that plural arcs or deflectors may be used. The reclamation portion 110 encircles at least a portion of the cone 28 and collects (via the channel 84) the fluid spray that is blocked by the deflector, routing the blocked and collected fluid through the drain 108 to a reservoir. In some embodiments, the deflector and reclamation portion 110 may be an integrated assembly (e.g., molded or cast), and in some embodiments, these components may be modular components that are assembled together to comprise the directional shroud 32. The truncated fluid spray dispersed from the aperture 34 is directed out of the paper (FIG. 4) in an arc-like pattern, similar to that shown in FIG. 1B.

Figure 5A:
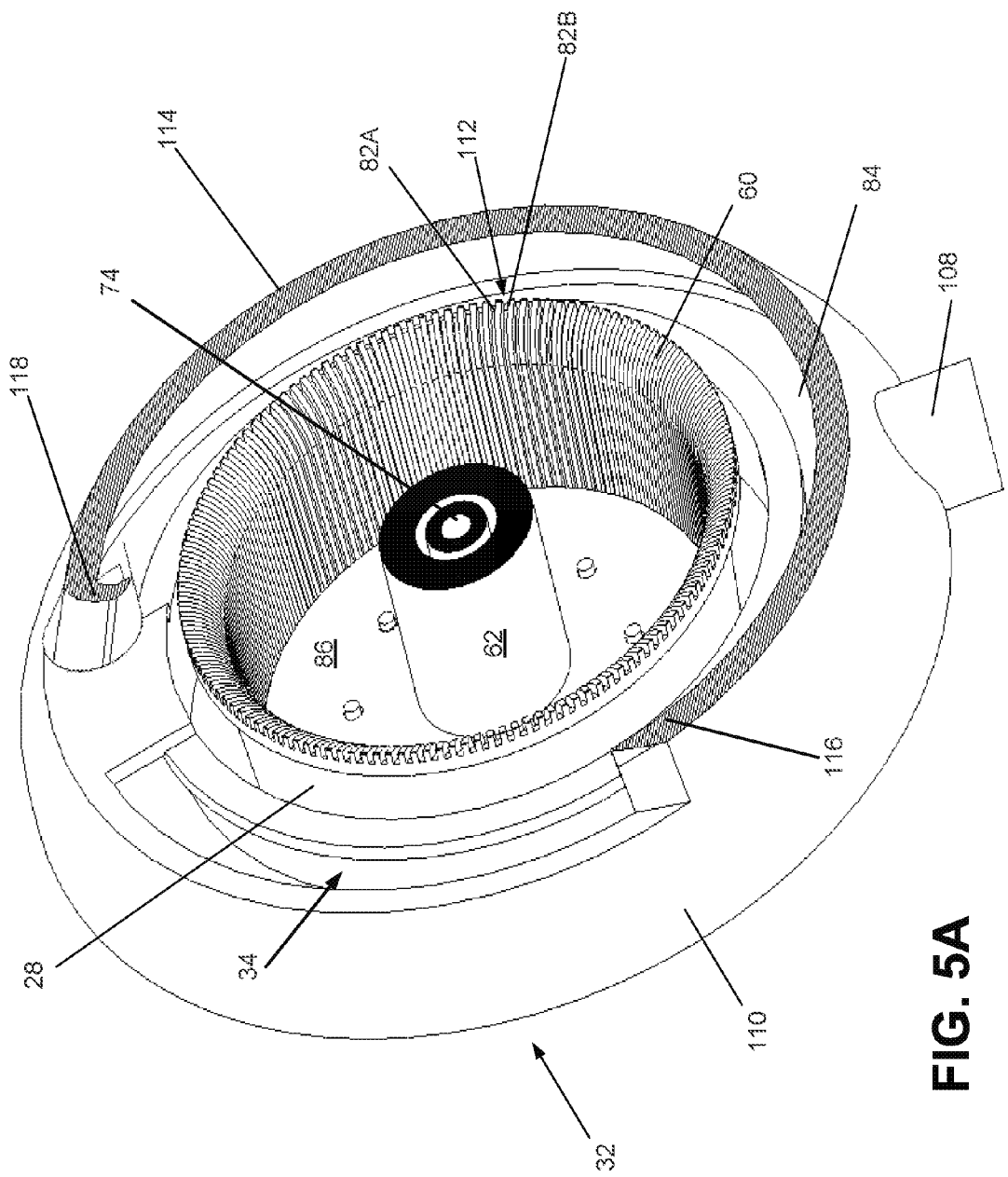
FIG. 5A is a schematic diagram of an embodiment of an example directional shroud having a single arc on the surface used to block a single arc portion of a circular spray pattern dispersed from a circumferential lip of a CDA nozzle cone.

Referring to FIG. 5A, shown is a schematic diagram that illustrates, from the perspective of the lip 60 and looking above the lip into the interior of the cone 28, an embodiment of an example directional shroud 32 having a single arc on the surface used to block a single arc portion of a circular spray pattern dispersed from the circumferential lip 60 of the nozzle 24 (FIGS. 3A-3D). As evident from FIG. 5A, the frame coupling portion 70 of the directional shroud 32 is omitted to reveal the arc structures of the directional shroud 32. Although illustrated as integrated into the surface of the directional shroud 32 (where the frame coupling portion 70 is mounted to, or integrated with, the bottom portion of the shroud 32 and the collective assembly is rotatable relative to the cone 28), in some embodiments, the arc structure may be integrated into or coupled to (in a modular configuration) the frame coupling portion 70 (or both the lower portion of the shroud 32 and the frame coupling portion 70). In some embodiments, the frame coupling portion 70 and bottom portion of the directional shroud 32 may be rotatable relative to each other. In some embodiments, the arc may be disposed on a rail or other slide-enabling surface adjacent the interior surface of the directional shroud 32, the arc moveable (e.g., rotatable) relative to the directional shroud 32, the movement permitting the aperture 34 to have a variably adjusted outlet area. In the latter embodiment, for plural arcs, the arcs may be moveable in kind or independently moveable in some embodiments. Also shown is the reclamation portion 110 of the directional shroud 32. It should be appreciated within the context of the present disclosure that the configuration of the directional shroud 32 shown in FIG. 5A is one among many possible configurations. The directional shroud 32 covers all but a portion (i.e., corresponding to the aperture 34) of the lip 60 of the cone 28. The shaft 62 is shown surrounding in concentric manner the spindle 74, where one end of the spindle 74 is obscured by the surface of the cap 86 that is disposed in the interior of the cone 28 and integrated with, or coupled to, the shaft 62. Grooves are shown more clearly in FIG. 5A, such as groove 112 defined between adjacent ridges 82A and 82B. The grooves 112 channel the fluid within the interior of the cone 28, the channeled fluid broken into uniform size droplets at the lip 60 by the ridges 82. Also shown in FIG. 5A is an arc 114, as generally described above, in one embodiment disposed on the surface of the directional shroud 32 to which the frame coupling portion 70 mounts (e.g., integrated with or coupled to), the arc 114 extending radially from approximately, using a clock analogy, the one o'clock position to the eight o'clock position when viewed in perspective. Other radial lengths of the arc 114 are contemplated to be within the scope of the disclosure. The arc 114 comprises a surface that radially covers the lip 60, except at the aperture 34. Functionally, the arc 114 enables the directional shroud 32 to block at least partially the circular spray dispersed at the lip 60, enabling a portion of the spray (e.g., a truncated portion of the circular spray) to pass through the aperture 34 and be applied to the target. In other words, in one embodiment, the arc 114 blocks the spray except in the gap corresponding to the aperture 34. The blocked portion is channeled via the channel 84 and through the drain 108 as described above.

Figure 5B:
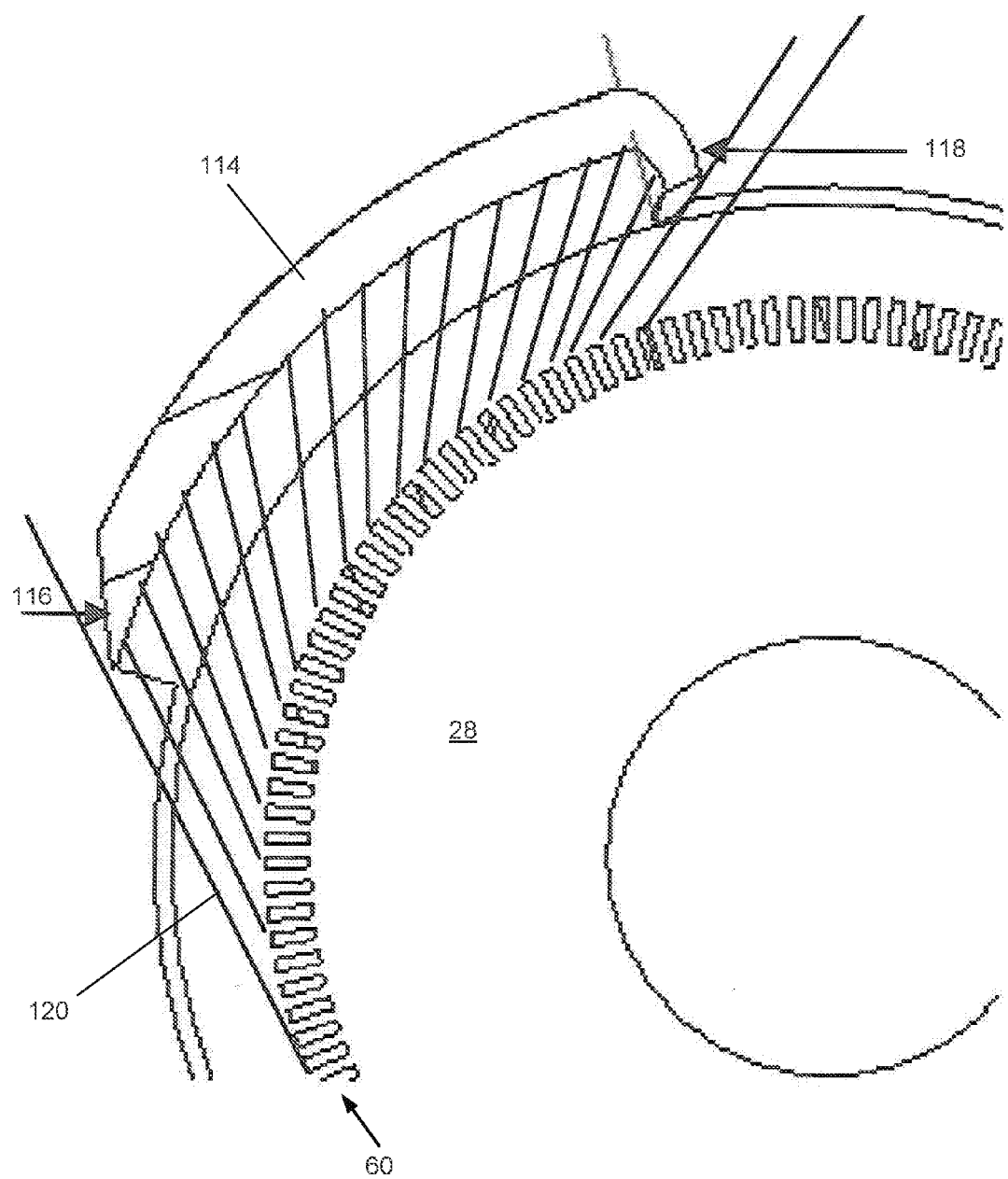
FIG. 5B is a schematic diagram that illustrates an example configuration of the single arc depicted in FIG. 5A.

The arc 114 comprises a leading edge 116 and a trailing edge 118, which are two edges that cut into the spray of the droplets. Referring now to FIG. 5B, shown is a portion of the droplets, represented by lines 120, dispersed from the lip 60 of the cone 28. It should be appreciated that the entire circular spray is dispersed from the cone 28, but only a portion is depicted here. The leading edge 116 of the arc 114 of the directional shroud 32 comprises a sharp geometric configuration that cuts into the spray to reduce the transition area that may include an intermediate number of droplets. The trailing edge 118 of the directional shroud 32 has a hooked-configuration (e.g., the hook directed inward toward the center of the cone 28) to direct the fluid back around towards the bottom (e.g., when in vertical orientation) of the directional shroud 32, enabling the blocked fluid to be channeled to a reservoir.

Note that some embodiments may omit the hooked configuration of the trailing edge 118, or have a different configuration (e.g., "L" shaped, etc.) to direct fluid back to the bottom of the directional shroud 32.

Figure 6:
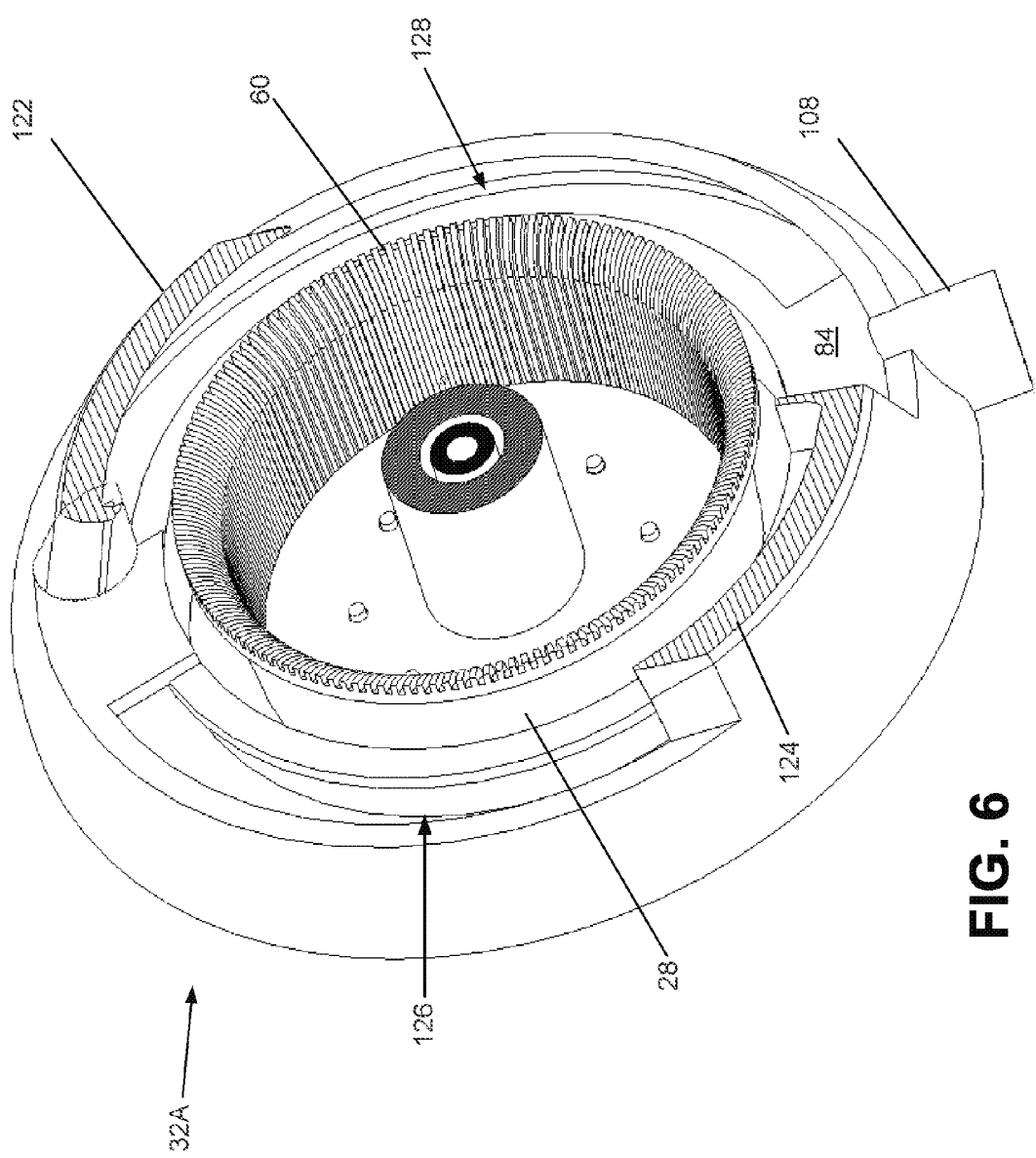
FIG. 6 is a schematic diagram of an embodiment of an example directional shroud having plural arcs on the surface used to block plural, discontiguous arc portions of a circular spray pattern dispersed from a circumferential lip of a CDA nozzle cone.

Referring now to FIG. 6, shown is another embodiment of a directional shroud, denoted as directional shroud 32A. In this example embodiment, the directional shroud 32A comprises plural arcs 122 and 124 that block the circular fluid spray dispersed from the lip 60 of the cone 28. As with the single arc 114 of FIG. 5A, the plural arcs 122 and 124 may be integrated into, or coupled to, the frame coupling portion 70, the bottom portion of the directional shroud 32A, or a combination thereof as part of a single-piece shroud structure or modular configuration (with the assembly collectively moving together or the frame coupling portion 70 and bottom portion of the directional shroud 32A moveable relative to each other). Also, in some embodiments, the plural arcs 122 and 124 may be slidably rotated relative to the directional shroud 32A along an adjacent surface, either collectively as a whole or individually moved according to independently moveable rails or surfaces. It should be appreciated that the quantity of arcs may be greater in some embodiments. Apertures 126 and 128 allow the fluid to pass the directional shroud 32A, whereas the arcs 122 and 124 block the circular spray in a manner similar to that described above, with the blocked fluid flowing in the channel 84 located at the bottom of the directional shroud 32A and routed to a reservoir via the drain 108. Similar to the structure described above, each of the arcs 122 and 124 comprise a leading and trailing edge, though some embodiments may omit such configurations or use only for select arcs.

Figure 7A:
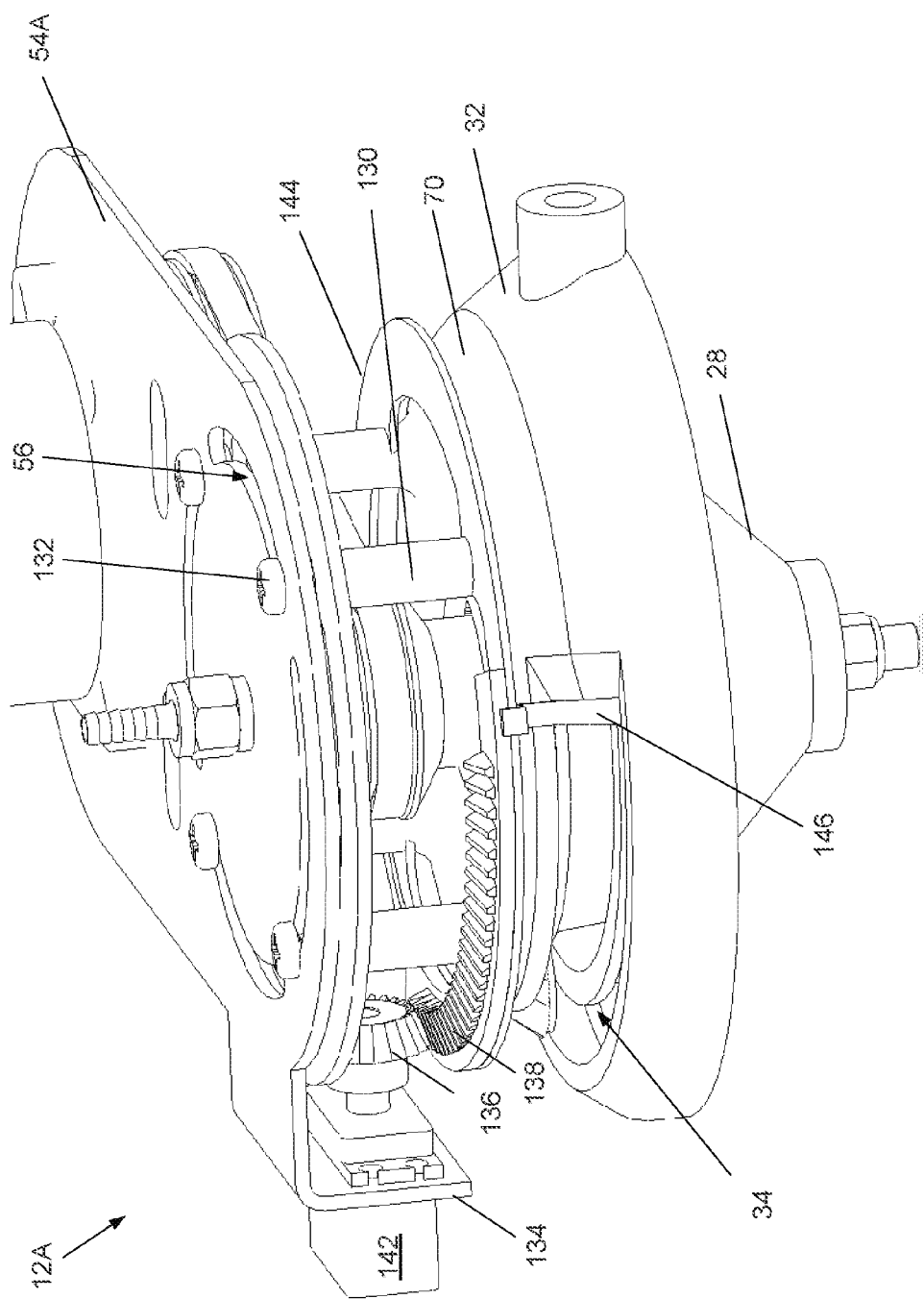
Figure 7B:
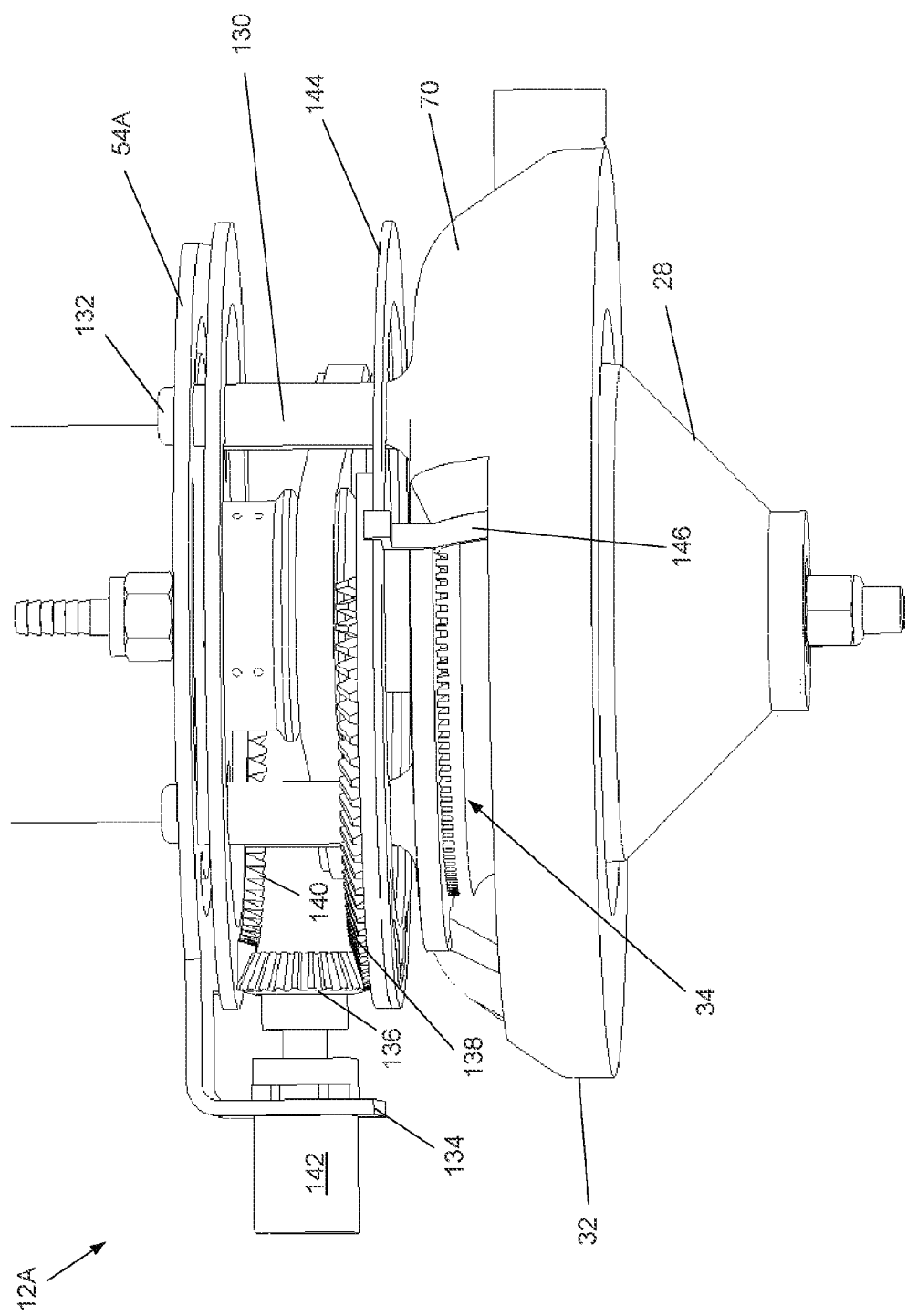
Figure 7D:
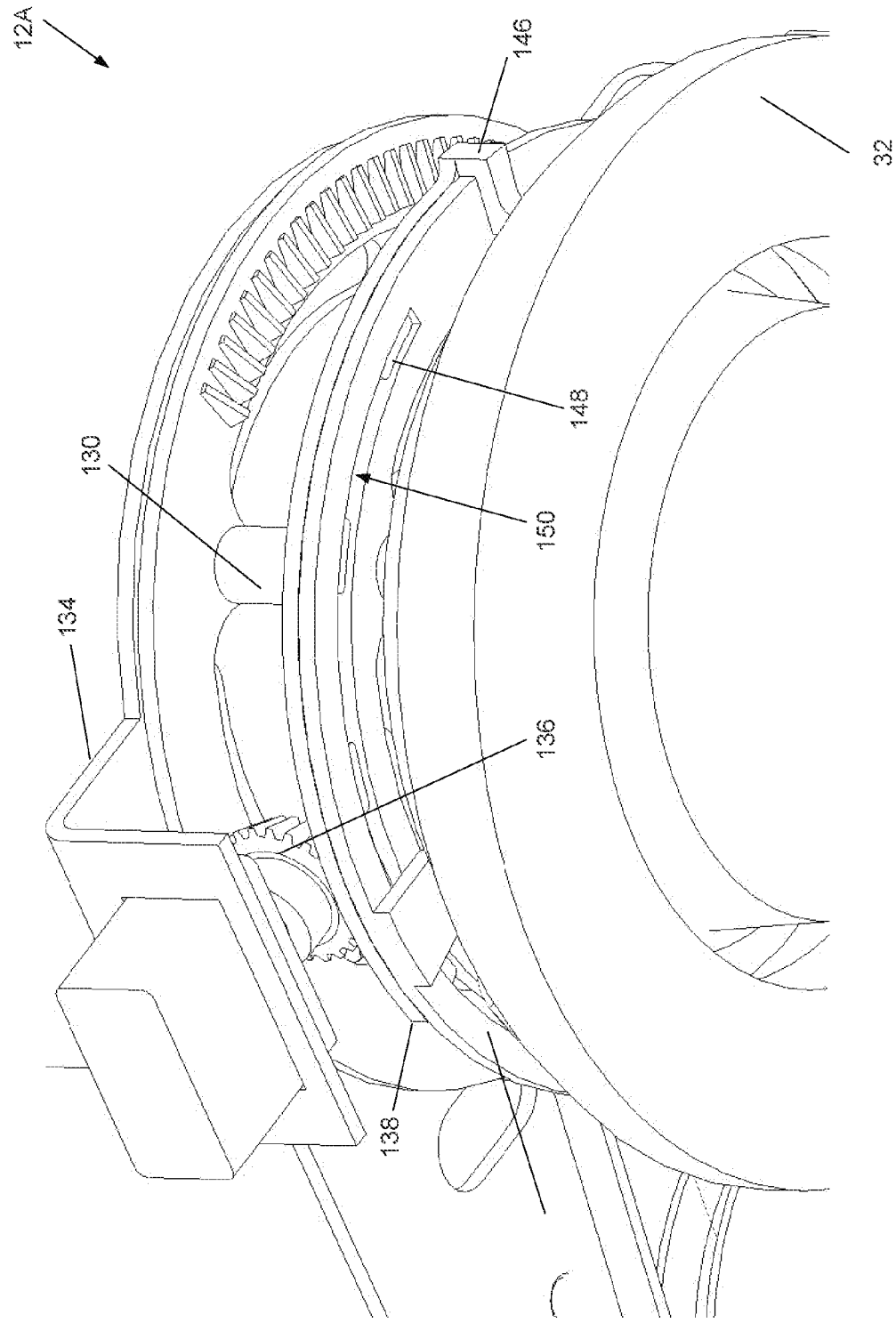

Although the rotatably adjustable directional shrouds 32 and 32A are shown with fixed arc configurations (e.g., the spray pattern adjusted via the rotation of the directional shroud), in some embodiments, a plurality of moveable arcs may be disposed on a rail running circumferentially on or within a fixed-position directional shroud and positioned manually, or via automated control (e.g., a motor, gear assembly, etc.), as set forth above.

Referring now to FIGS. 7A-7D, shown is an embodiment of a CDA system 12A configured for automated or semi-automated rotation of the aperture 34 to provide an adjustable spray pattern angle (e.g., to control the direction of the spray arc). It should be appreciated by one having ordinary skill in the art in the context of the present disclosure that the mechanism for adjusting the aperture 34 (and hence spray pattern angle) is one example among many different mechanisms for enabling the rotation, and hence some embodiments may utilize these other mechanisms. Focusing in particular on some select features in FIGS. 7A-7D, the CDA system 12A comprises the cone 28 and shroud 32 coupled to a frame 54A via the frame coupling portion 70. As noted, column-like extensions of the frame coupling portion 70, such as extension 130, insert through the respective plural slots 56, secured there with a head 132 (and possibly other hardware, such as a bushing, etc.), which enables the directional shroud 32 to rotatably slide to enable the aperture 34 to correspondingly rotate relative to the fluid dispersing end of the cone 28. The frame 54A comprises, in one embodiment, an angled portion 134. In some embodiments, another securing member may be coupled (e.g., screwed, bolted, etc.) to the frame 54A to serve the same function. The angled portion 134 has secured to it a pinion 136 that is in engageable contact with a bottom rack 138 and a top rack 140 (see FIGS. 7B-7C). The rack 138 is coupled to a circular rail 144, which in turn is coupled to the directional shroud 32 via connector 146 to ensure guided movement. In one embodiment, the rack 138 is coupled to the circular rail 144 through the use of tabs 148 extending from the rack 138 through one or more slots 150 in the rail 144, as best shown in FIG. 7D. Note that other mechanisms for ensuring coincident movement between the rack 138 and the rail 144 may be used in some embodiments. When the pinion 136 rotates, causing for instance the rack 138 (and hence rail 144) to rotate to the left in FIG. 7A, the directional shroud 32 moves left by virtue of the connector 146 connecting the directional shroud 32 to the rail 144, causing the aperture 34 to also move left relative to the fluid dispersed from the cone 28. A motor 142 (e.g., servo) may be used to provide the motive force for the rack and pinion system, and may be energized hydraulically, electrically, pneumatically, or mechanically. In some embodiments, the motor 142 may be replaced with an actuator that is powered from elsewhere.

FIG. 8 shows another embodiment of a CDA system 12B, wherein two rack and pinion arrangements are used to control not only the direction of the spray but also the scope or arc of the spray independently. Like numbered items from FIGS. 7A-7D are shown in FIG. 8, with similar functionality that is not described here for the sake of brevity. In addition, the CDA system 12B comprises another motor 152 coupled to an angled portion 154 similar to angled portion 134, the motor 152 configured to drive an additional pinion 156 along rack 158. In the depicted embodiment, the upper rack 158 and lower rack 138 operate independently. For instance, to change the spray arc(s), both pinions 156 and 136 operate in opposing directions (rotations) at the same time, causing the respective racks 158 and 138 (and rails) to move in opposing directions using a similar mechanism to that described for FIGS. 7A-7D, yet extended using two subsystems. Also, to change the direction of the spray arc(s), both pinions 156 and 136 operate in the same direction to cause the respective racks 158 and 138 (and rails) to move in the same direction. As an example, and referring to FIG. 2B, the arc 58 may be narrowed from a maximum spray arc 58 by virtue of the pinions 156 and 136 moving in opposing rotations (causing their respective racks/rails to move in opposing directions), whereas the direction of the spray arc 58 may be moved to another orientation by the coincident rotations of the racks and rails at the same time. In one embodiment, the top rail may be molded into the top part of the shroud 32. In some embodiments, a ring may be used (e.g., having four (4) holes, the ring sandwiched in between the shroud extension 130 (FIG. 7C) and the frame 54 with a washer or other securing mechanisms.

Figure 8:
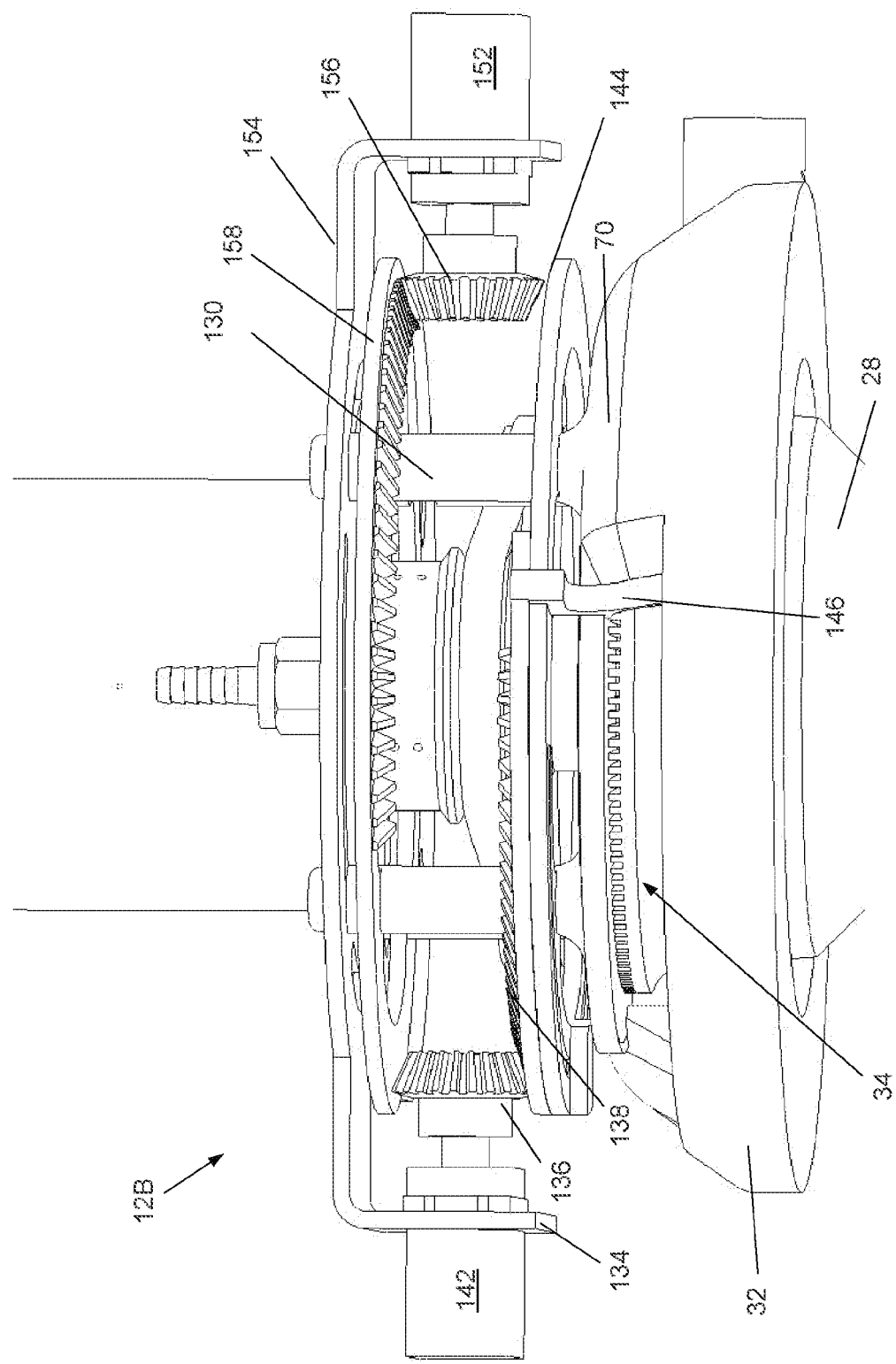

Having described certain embodiments of a CDA system 12, it should be appreciated within the context of the present disclosure that one embodiment of a CDA method (e.g., as implemented in one embodiment by the CDA system 12, though not limited to the specific structures shown in FIGS. 1A-8), denoted as method 160 and illustrated in FIG. 8, comprises causing a CDA nozzle cone to first rotate along a first axis of rotation, the first rotation causing a circular fluid spray to be dispersed from the cone with substantially uniform size droplets (162). The method 160 further comprises adjusting the orientation of the nozzle (164). For instance, as described above, adjustment may be achieved manually or automatically (or a combination of both). The method 160 further comprises, subsequent to the adjustment, causing the CDA nozzle cone to second rotate along a second axis of rotation orthogonal to the first axis of rotation, the second rotation causing the circular fluid spray to be dispersed from the cone with substantially uniform size droplets (162). As explained above, adjustment may be made according to additional axes of rotation.

Any process descriptions or blocks in flow diagrams should be understood as merely illustrative of steps performed in a process implemented by a CDA system, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A controlled droplet application (CDA) system, comprising:
   a frame; and
   a CDA nozzle adjustably coupled to the frame, the CDA nozzle comprising a cone that is movable relative the frame between a first position having a first axis of rotation and a second position having a second axis of rotation wherein the second axis of rotation is orthogonal to the first axis or rotation, wherein the CDA nozzle further comprises a directional shroud, the directional shroud comprising plural arcs, the plural arcs covering all but a portion of a product-dispensing lip of the cone.

2. The CDA system of claim 1, wherein the directional shroud further comprises an aperture disposed where the plural arcs are not.

3. The CDA system of claim 1, wherein the portion is contiguous.

4. The CDA system of claim 1, wherein the portion is discontiguous.

5. The CDA system of claim 1, wherein the directional shroud is rotatable.

6. A controlled droplet application (CDA) method, comprising:
   causing a controlled droplet application (CDA) nozzle cone to first rotate along a first axis of rotation, the first rotation causing a circular fluid spray to be dispersed from the cone with substantially uniform size droplets;
   adjusting the orientation of the nozzle;
   subsequent to the adjustment, causing the CDA nozzle cone to second rotate along a second axis of rotation orthogonal to the first axis of rotation, the second rotation causing the circular fluid spray to be dispersed from the cone with substantially uniform size droplets;
   deflecting with a directional shroud the circular fluid spray caused by the first rotation, wherein a first undeflected portion of the circular fluid spray is dispersed to a first target through an aperture of the directional shroud, the deflecting causing a change from the circular fluid spray to a first truncated fluid spray corresponding to the first undeflected portion; and
   adjusting the direction of the first truncated fluid spray based on a rotational adjustment of the directional shroud, wherein the adjusted truncated fluid spray is directed to a second target based on the cone first rotating along the first axis of rotation.

7. The method of claim 6, further comprising deflecting with a directional shroud the circular fluid spray caused by the second rotation, wherein a second undeflected portion of the circular fluid spray is dispersed to a third target through the aperture of the directional shroud, the deflecting causing a change from the circular fluid spray to a second truncated fluid spray corresponding to the second undeflected portion.

8. The method of claim 7, further comprising adjusting the direction of the second truncated fluid spray based on a rotational adjustment of the directional shroud, wherein the adjusted truncated fluid spray is directed to a fourth target based on the cone second rotating along the second axis of rotation.

9. The method of claim 6, further comprising, subsequent to another adjustment, causing the CDA nozzle cone to third rotate along a third axis of rotation.

10. A controlled droplet application (CDA) method, comprising:
    causing a controlled droplet application (CDA) nozzle cone to first rotate along a first axis of rotation, the first rotation causing a circular fluid spray to be dispersed from the cone with substantially uniform size droplets;
    adiustinq the orientation of the nozzle;
    subsequent to the adjustment, causing the CDA nozzle cone to second rotate along a second axis of rotation orthogonal to the first axis of rotation, the second rotation causing the circular fluid spray to be dispersed from the cone with substantially uniform size droplets;
    deflecting with a directional shroud the circular fluid spray caused by the first rotation, wherein first plural undeflected portions of the circular fluid spray are dispersed to plural targets through first plural apertures of the directional shroud, the deflecting causing a change from the circular fluid spray to first plural truncated fluid sprays corresponding to the first plural undeflected portions; and adjusting the direction of the first plural truncated fluid sprays based on a rotational adjustment of the directional shroud, wherein the adjusted first plural truncated fluid sprays are directed to different targets than the targets before the rotational adjustment based on the cone first rotating along the first axis of rotation.

11. The method of claim 10, further comprising deflecting with a directional shroud the circular fluid spray caused by the second rotation, wherein second undeflected portions of the circular fluid spray are dispersed to second plural targets through second plural apertures of the directional shroud, the deflecting causing a change from the circular fluid spray to second plural truncated fluid sprays corresponding to the second plural undeflected portions.

12. The method of claim 11, further comprising adjusting the direction of the second plural truncated fluid sprays based on a rotational adjustment of the directional shroud, wherein the adjusted truncated fluid sprays are directed to different targets than the targets before the rotational adjustment based on the cone second rotating along the second axis of rotation.

\* \* \* \* \*